United States Patent
Kallio et al.

(10) Patent No.: US 11,028,485 B2
(45) Date of Patent: Jun. 8, 2021

(54) MATERIAL ADDITION FOR ARTICLE IDENTIFICATION

(71) Applicant: GOODRICH CORPORATION, Charlotte, NC (US)

(72) Inventors: Jeremy Daniel Kallio, Tallmadge, OH (US); J. Keith Williamson, Fairview Park, OH (US); Aaron T. Nardi, East Granby, CT (US)

(73) Assignee: Goodrich Corporation, Charlotte, NC (US)

( * ) Notice: Subject to any disclaimer, the term of this patent is extended or adjusted under 35 U.S.C. 154(b) by 446 days.

(21) Appl. No.: 15/799,719

(22) Filed: Oct. 31, 2017

(65) Prior Publication Data

US 2019/0127855 A1 May 2, 2019

(51) Int. Cl.
| | |
|---|---|
| *C23C 24/04* | (2006.01) |
| *C23C 4/12* | (2016.01) |
| *C23C 4/18* | (2006.01) |
| *B23K 26/342* | (2014.01) |
| *B41M 5/24* | (2006.01) |
| *B41M 5/26* | (2006.01) |

(52) U.S. Cl.
CPC ............ *C23C 24/04* (2013.01); *B23K 26/342* (2015.10); *B41M 5/24* (2013.01); *C23C 4/12* (2013.01); *C23C 4/18* (2013.01); *B41M 5/26* (2013.01)

(58) Field of Classification Search
CPC ....................................................... B41M 5/24
See application file for complete search history.

(56) References Cited

U.S. PATENT DOCUMENTS

| 1,165,920 | A | * | 12/1915 | Sadamasa ............. C04B 41/009 |
|---|---|---|---|---|
| | | | | 427/292 |
| 4,327,283 | A | | 4/1982 | Heyman et al. |
| 4,353,949 | A | | 10/1982 | Kyminas et al. |
| 2002/0097279 | A1 | | 7/2002 | Mimura et al. |
| 2006/0191406 | A1 | | 8/2006 | Kucher et al. |
| 2017/0018074 | A1 | | 1/2017 | Karlen et al. |
| 2017/0120338 | A1 | | 5/2017 | Goeing et al. |

FOREIGN PATENT DOCUMENTS

| EP | 0443639 | 8/1991 |
|---|---|---|
| KR | 20130010352 | 1/2013 |
| WO | 9925562 | 5/1999 |
| WO | 2010115858 | 10/2010 |
| WO | 2016061478 | 4/2016 |

OTHER PUBLICATIONS

European Patent Office, European Search Report dated Mar. 21, 2019 in Application No. 18203149.2.

* cited by examiner

*Primary Examiner* — Ian A Rummel

(74) *Attorney, Agent, or Firm* — Snell & Wilmer L.L.P.

(57) ABSTRACT

A method for marking an article may comprise forming a raised pad on a substrate of the existing article by applying a material to a surface of the substrate using a material addition process, and forming a design on a surface of the raised pad. The raised pad may be formed on the surface of the substrate to prevent mechanical stress from being propagated from the raised pad to the substrate in response to the design being formed on the raised pad.

7 Claims, 3 Drawing Sheets

A-A

MATERIAL ADDITION FOR ARTICLE IDENTIFICATION

FIELD

The present disclosure relates generally to methods for article identification and more specifically to material addition methods for article identification.

BACKGROUND

Article marking may be utilized to identify an article to a particular configuration. Some common marking techniques, such as stamping, include forming a depression into the article being marked. The depression is typically formed directly into the article.

SUMMARY

A method for marking an existing article is disclosed, comprising, forming a raised pad on a substrate of the existing article by applying a material to a surface of the substrate using a material addition process, and forming a design on a surface of the raised pad.

In various embodiments, the design defines a depression relative to the surface of the raised pad, a depth of the depression being less than a thickness of the raised pad.

In various embodiments, the design defines a raised surface relative to the surface of the raised pad.

In various embodiments, the material addition process comprises a cold spray process.

In various embodiments, the material addition process comprises at least one of a thermal spray process or a laser metal powder addition process.

In various embodiments, the forming the design includes at least one of a material removal process, a design material addition process, or a mechanical deformation process.

In various embodiments, the design comprises at least one of bar codes, matrix bar codes, quick response codes (QR codes), data matrix codes, proprietary codes, triangular codes, numeric bar codes, alpha-numeric bar codes, 2-dimensional bar codes, symbols, written characters, letters, numerals, alphanumerics, glyphs, pictograms, syllabograms, logograms, or combinations thereof.

In various embodiments, the substrate includes a surface material comprising a first modulus, the material comprising a second modulus, the first modulus being greater than the second modulus.

A method for marking an existing article is disclosed, comprising forming a raised pad on a substrate of the existing article using a material addition process by applying a first material to a first surface of the substrate to form a first layer of the raised pad and applying a second material to the first layer to form a second layer of the raised pad, and forming a design on the raised pad, wherein a surface material of the substrate comprises a first modulus, the first material comprises a second modulus, the first modulus being greater than the second modulus.

In various embodiments, the design is formed on the raised pad using a stress-inducing process.

In various embodiments, the second material comprises a third modulus, the third modulus being greater than the second modulus.

In various embodiments, the raised pad comprises a second surface, the design defining a depression relative to the second surface, a depth of the depression being less than a thickness of the raised pad.

In various embodiments, at least one of the first material and the second material is applied using at least one of a cold spray process, a thermal spray process, or a laser metal powder addition process.

In various embodiments, a thickness of the first layer is at least one of equal to or greater than a thickness of the second layer.

In various embodiments, the design comprises at least one of bar codes, matrix bar codes, quick response codes (QR codes), data matrix codes, proprietary codes, triangular codes, numeric bar codes, alpha-numeric bar codes, 2-dimensional bar codes, symbols, written characters, letters, numerals, alphanumerics, glyphs, pictograms, syllabograms, logograms, or combinations thereof.

A marked article is disclosed, comprising a substrate including a first surface and a surface material, a raised pad on the first surface, the raised pad including a second surface, and a design on the raised pad, wherein the raised pad is formed on the first surface using a material addition process to prevent mechanical stress from being propagated from the raised pad to the substrate in response to the design being formed on the raised pad.

In various embodiments, the design defines a depression relative to the second surface.

In various embodiments, the design defines a raised surface relative to the second surface.

In various embodiments, the surface material comprises a first modulus, and the raised pad comprises a material comprising a second modulus, the first modulus being greater than the second modulus.

In various embodiments, the surface material comprises a first modulus, the raised pad comprises a first layer comprising a second modulus, and a second layer comprising a third modulus, the first modulus being greater than the second modulus, the third modulus being greater than the second modulus, and wherein the first layer is disposed between the substrate and the second layer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
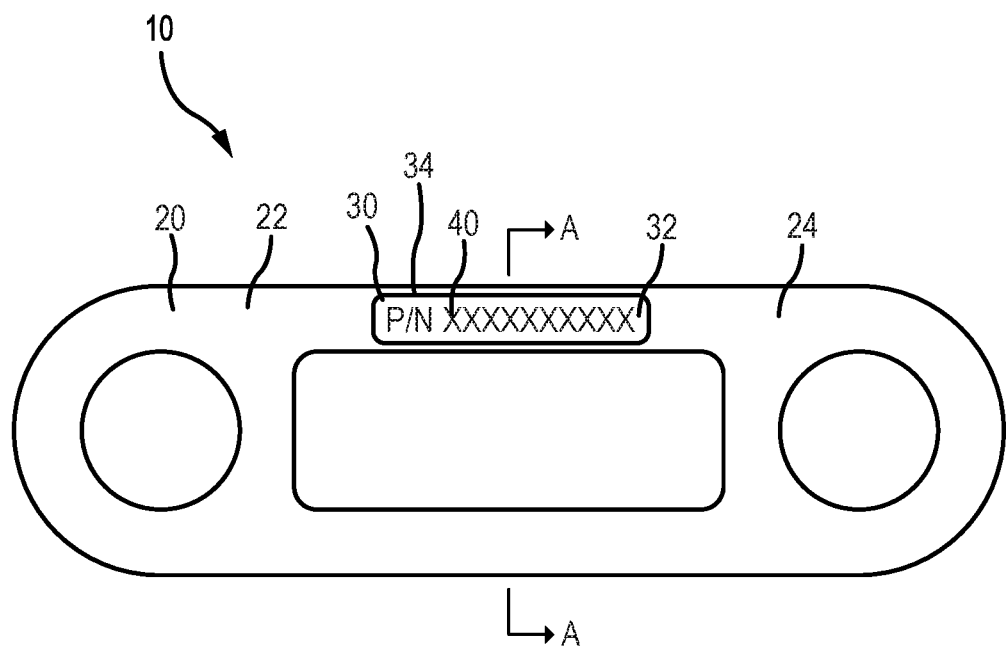
FIG. 1A and FIG. 1B illustrate a marked article, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

Certain articles, such as industrial components, engine components, or vehicle components, may be marked for identification. Some common marking techniques, such as stamping for example, may cause undesirable stress risers which can weaken the article being marked. Such stress risers may cause a crack to form in the substrate of the component. Furthermore, when a crack forms in a hard, high modulus coating (e.g., coatings having a modulus substantially equal to or greater than the substrate) of a component, that crack may act just like a crack in the substrate and propagate as the theories of fracture mechanics dictate, particularly with high bond and cohesive strength materials. Coatings like tungsten carbide and other hard, brittle cermets or ceramics have shown this tendency since these coatings resist strain and have a modulus of elasticity equal to or greater than steel. When brittle cracking occurs, that crack may propagate into a more ductile metal substrate (e.g., steel, aluminum, titanium, etc.) where the effective crack length is increased with increasing modulus differential.

Raised pads of the present disclosure may be formed onto an existing article. A design, or marking, may be formed on the raised pad. In various embodiments, the raised pad may comprise an elastic modulus which is less than an elastic modulus of the article. As used herein, the term "elastic modulus" may refer to a measure of the stiffness of a solid material, also known as Young's modulus. Raised pads of the present disclosure may be configured to mitigate mechanical stress from being propagated into the article. As used herein, the term "existing article" may refer to a part which has already been manufactured. Stated differently, a raised pad may be deposited onto an article after the article has already been manufactured and using a separate process from the process used to manufacture the article.

Figure 1B:
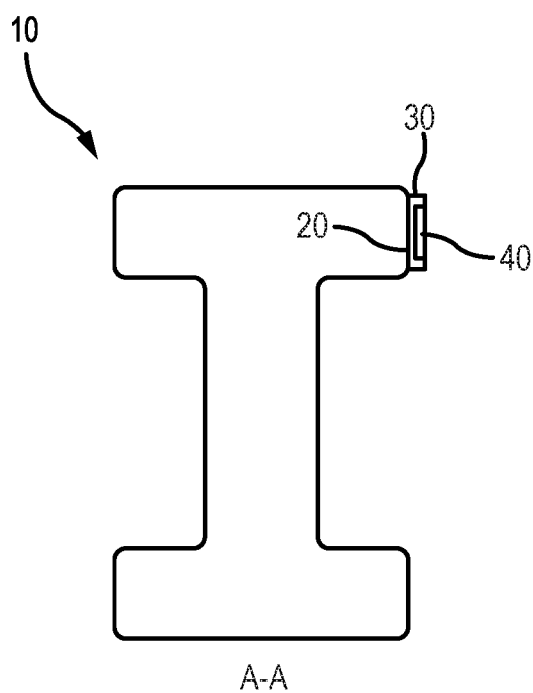

With reference to FIG. 1A and FIG. 1B, a marked article 10 is illustrated, in accordance with various embodiments. In various embodiments, marked article 10 may be a vehicle component. Marked article 10 may comprise a substrate 20 having a surface (also referred to herein as a first surface) 22 and a surface material 24. Surface 22 may comprise an outer surface. Marked article 10 may comprise a raised pad 30. Raised pad 30 may be formed onto surface 22 via a material addition process, as described herein. Raised pad 30 may have a surface (also referred to herein as a second surface) 32 and a pad material 34. A design 40 may be formed on raised pad 30. Design 40 may be formed on surface 32.

The surface material 24 may comprise any suitable material, including, but not limited to, a metal, an alloy, a ceramic, a cermet, a ceramic matrix composite, a thermal barrier coating, a nickel-based superalloy, a steel, an aluminum, a titanium, a McrAlY material, a chromium-molybdenum, a chromium-molybdenum-vanadium, or combinations thereof.

The pad material 34 may comprise any suitable material, including, but not limited to, a metal, an alloy, a ceramic, a cermet, a ceramic matrix composite, a thermal barrier coating, a nickel-based superalloy, a steel, an aluminum, a titanium, a McrAlY material, a chromium-molybdenum steel, a chromium-molybdenum-vanadium steel, or combinations thereof.

The design 40 may be any suitable design, including, but not limited to a bar code, a matrix bar code, a quick response code (QR code), a data matrix code, a proprietary code, a triangular code, a numeric bar code, an alpha-numeric bar code, a 2-dimensional bar code, a symbol, a written character, a letter, a numeral, an alphanumeric, a glyph, a pictogram, a syllabogram, a logogram, or a combination thereof.

Marked article 10 may comprise a component for machinery and/or vehicles, including air and land vehicles. Substrate 20 and raised pad 30 may comprise similar or dissimilar materials, as described herein.

Figure 2A:
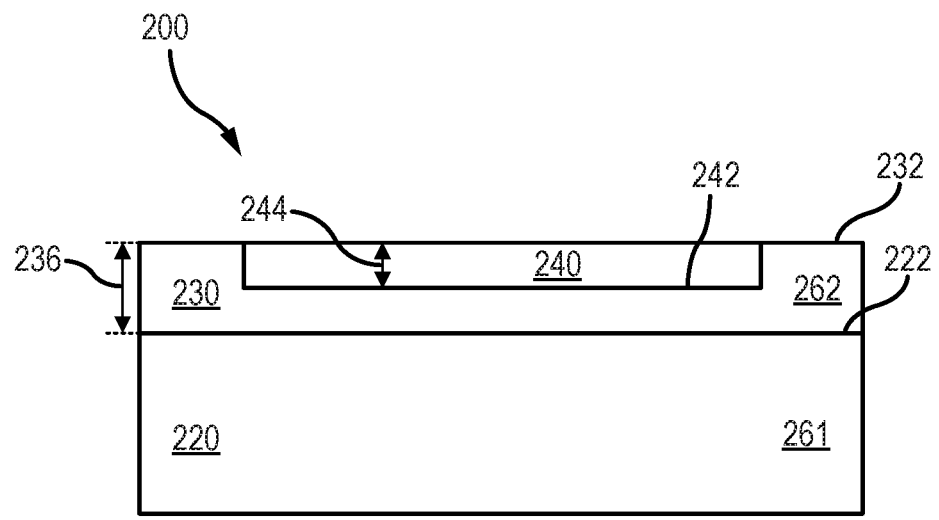
FIG. 2A illustrates a cross-sectional view of a marked article having a design defining a depression relative to a raised pad surface, in accordance with various embodiments.
Figure 2B:
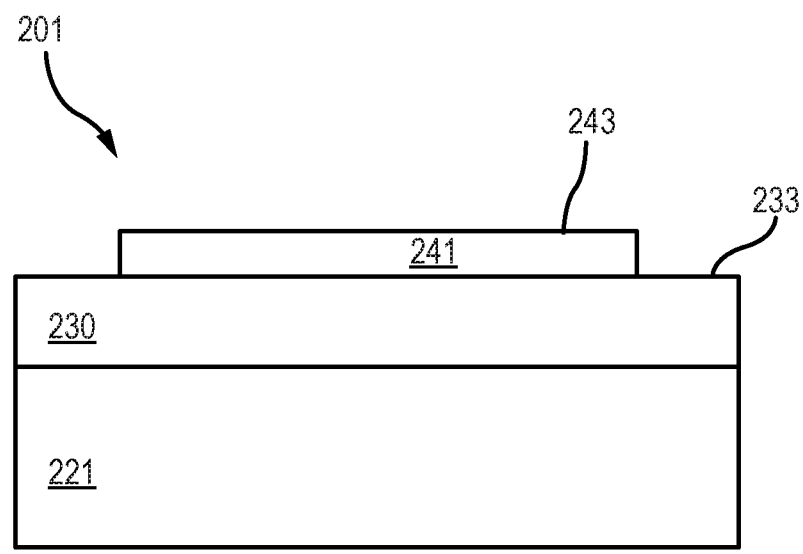
FIG. 2B illustrates a cross-sectional view of a marked article having a design defining a raised surface relative to a raised pad surface, in accordance with various embodiments.

With reference to FIG. 2A, a marked article 200 is illustrated, in accordance with various embodiments. In various embodiments, marked article 10 may be similar to marked article 200, with momentary reference to FIG. 1A and FIG. 1B. Marked article 200 may comprise a substrate 220, a raised pad 230, and a design 240. Raised pad 230 may be formed on surface 222 of substrate 220. Design 240 may be formed on raised pad 230. Design 240 may be formed on surface 232 of raised pad 230. Design 240 may define a depression 242 relative to surface 232. A depth 244 of depression 242 may be less than a thickness 236 of raised pad 230. In various embodiments, depth 244 may be negative such that the mark (i.e, design 240) is above the surface of the raised pad. In various embodiments, depth 244 may be negative in response the marking method utilizing a technique of material addition rather than removal or deformation, such as laser marking using ink based techniques, cold spray, and/or powder injected laser deposition. For example, with momentary reference to FIG. 2B, a marked article 201 having a design 241 formed via material addition is illustrated, in accordance with various embodiments. Marked article 201 may comprise a substrate 221, a raised pad 231, and design 241. Design 241 may define a raised surface 243 relative to surface 233 of raised pad 231.

In various embodiments, with reference to FIG. 2A, substrate 220 may comprise a first elastic modulus (first modulus) 261. Raised pad 230 may comprise a second elastic modulus (second modulus) 262. First modulus 261 may be greater than second modulus 262. For example, raised pad 230 may be formed from aluminum and substrate 220 may be formed from steel. In this regard, the elasticity of raised pad 230 may prevent a stress-inducing process (e.g., stamping and/or engraving) from imparting mechanical stress to substrate 220. A stress in substrate 220 may induce a strain onto raised pad 230 which may then experience a significantly lower stress due to the difference in youngs modulus. In addition, if a crack was to form in raised pad 230, the traction forces at the pad-substrate interface (i.e., the location where raised pad 230 meets substrate 220) may be lower than if raised pad 230 were a high modulus material, such as steel for example. Finally, the method of pad addition (i.e., the method for forming raised pad 230), for example cold spray deposition, may produce compressive stresses in substrate 220 onto which raised pad 230 is deposited further mitigating the potential for damage propagation.

Figure 3:
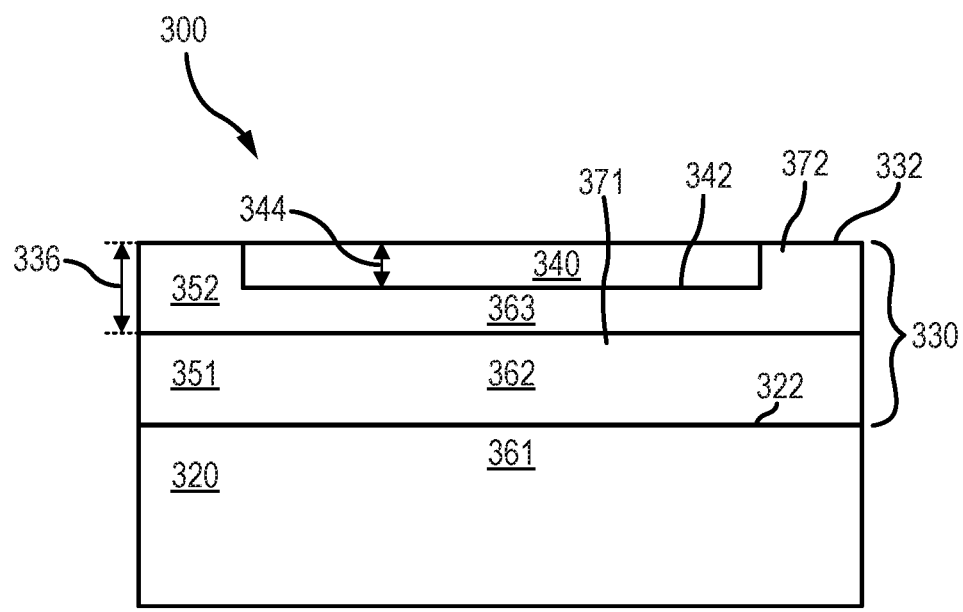
FIG. 3 illustrates a cross-sectional view of a marked article comprising a raised pad having a first layer and a second layer, in accordance with various embodiments.

With reference to FIG. 3, a marked article 300 is illustrated, in accordance with various embodiments. In various embodiments, marked article 10 may be similar to marked article 300, with momentary reference to FIG. 1A and FIG. 1B. Marked article 300 may comprise a substrate 320, a raised pad 330, and a design 340. Raised pad 330 may be formed on surface 322 of substrate 320. Raised pad 330 may comprise a first layer 351 and a second layer 352. First layer 351 may be disposed between substrate 320 and second layer 352. Design 340 may be formed on raised pad 330. Design 340 may be formed on surface 332 of raised pad 330. Design 340 may define a depression 342 relative to surface 332. A depth 344 of depression 342 may be less than a thickness 336 of raised pad 330.

In various embodiments, substrate 320 may comprise a first elastic modulus (first modulus) 361. First layer 351 of raised pad 330 may comprise a second elastic modulus (second modulus) 362. First modulus 361 may be greater than second modulus 362. For example, first layer 351 may be formed from aluminum and substrate 320 may be formed from steel. Second layer 352 of raised pad 330 may comprise a third elastic modulus (third modulus) 363. Third modulus 363 may be greater than second modulus 362. For example, first layer 351 may be formed from aluminum and substrate 320 and second layer 352 may be formed from steel. Providing first layer 351 between substrate 320 and second layer 352 may prevent mechanical stress in second layer 352 from propagating to substrate 320. The thickness of first layer 351 and second layer 352 may be designed to prevent mechanical stress in second layer 352 from propagating to substrate 320. In various embodiments, first layer 351 may be similar or greater in thickness with respect to second layer 352 to mitigate damage propagation from second layer 352 into substrate 320. Thus, first layer 351 may be referred to herein as a crack halting layer. Stated differently, first layer 351 may prevent cracks, resulting from a marking process and/or fatigue, from propagating from second layer 352 to substrate 320.

In various embodiments, first layer 351 may be formed from a first material 371. In various embodiments, second layer 352 may be formed from a second material 372. In various embodiments, second material 372 may comprise an elastic modulus which is greater than the elastic modulus of first material 371.

Figure 4:
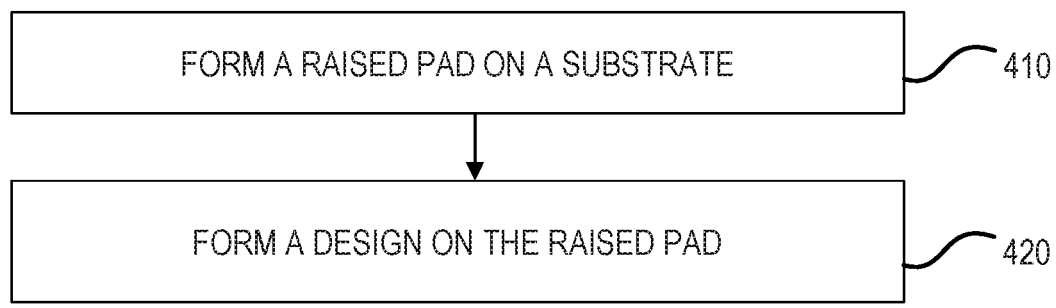
FIG. 4 illustrates a method for marking an article, in accordance with various embodiments.

With reference to FIG. 4, a method 400 for marking an existing article is provided, in accordance with various embodiments. Method 400 includes forming a raised pad on a substrate (step 410). Method 400 includes forming a design on the raised pad (step 420).

With combined reference to FIG. 1A, FIG. 1B, and FIG. 4, Step 410 may include forming raised pad 30 on substrate 20. Forming raised pad 30 may include applying pad material 34 to surface 22. Applying the pad material 34 to form raised pad 30 may comprise a material addition process (also referred to herein as a raised pad material addition process). A material addition process for forming raised pad 30, as used herein, may refer to a cold spray process, a thermal spray process, a laser metal powder addition process, or combinations thereof. In various embodiments, a cold spray process, as used herein, may refer to a particle deposition process wherein particles are accelerated towards a substrate, where they embed on impact, forming a strong bond with the substrate, wherein the particles remain below their melting point temperature during the deposition process. In various embodiments, a thermal spray process, as used herein, may refer to a particle deposition process wherein particles are accelerated towards a substrate, where they embed or partially-embed on impact, forming a strong bond with the substrate, wherein the particles are molten or semi-molten during the deposition process. In various embodiments, a laser metal powder addition process, as used herein, may refer to a process in which a metal powder is introduced to a melt pool created by a laser, otherwise commonly referred to as "blown powder laser deposition", "laser applied powder", or "directed energy powder deposition." Raised pad 30 may be formed using the material addition process to prevent mechanical stress from being propagated from raised pad 30 to substrate 20 in response to design 40 being formed on raised pad 30.

With momentary reference to FIG. 3, step 410 may include forming raised pad 330 by applying a first material 371 to surface 322 to form a first layer 351 and applying a second material 372 to the first layer 351 to form a second layer 352. Each of first layer 351 and second layer 352 may be formed consecutively by the material addition processes previously described. Raised pad 330 may be formed, by using a material addition process for two layers with different elastic modulus, to help reduce mechanical stress from being propagated from raised pad 330 to substrate 320 in response to design 340 being formed on raised pad 330.

Step 420 may include forming design 40 on raised pad 30. Design 40 may be formed using mechanical deformation techniques, laser induced material removal or addition techniques, or chemical removal or addition techniques.

In various embodiments, design 40 may be formed using a material removal process, a material addition process (also referred to herein as a design material addition process), a mechanical deformation process, or combinations thereof. Specifically, a material removal process may include laser engraving, laser etching, and/or chemical etching. A material addition process for forming design 40, as used herein, may include laser dye marking and/or laser metal powder addition. A mechanical deformation process may include dot peening, stamping, and/or laser shock peening. In various embodiments, a material removal process may be a stress inducing process. In various embodiments, a material addition process may be a stress inducing process. In various embodiments, a mechanical deformation process may be a stress inducing process.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for marking an existing article, comprising:

forming a raised pad on a substrate of the existing article using a material addition process by applying a first material to a first surface of the substrate to form a first layer of the raised pad and applying a second material to the first layer to form a second layer of the raised pad; and forming a design on the raised pad, wherein a surface material of the substrate comprises a first elastic modulus, the first material comprises a second elastic modulus, and the first elastic modulus is greater than the second elastic modulus, the second material comprises a third elastic modulus, the third elastic modulus is greater than the second elastic modulus, the first material is applied to the substrate via at least one of a cold spray process, a thermal spray process, and a laser metal powder addition process, and the second material is applied to the first material via at least one of the cold spray process, the thermal spray process, and the laser metal powder addition process.

2. The method of claim 1, wherein the design is formed on the raised pad using a stress-inducing process.

3. The method of claim 1, wherein the raised pad comprises a second surface, the design defining a depression relative to the second surface, a depth of the depression being less than a thickness of the raised pad.

4. The method of claim 1, wherein a thickness of the first layer is at least one of equal to or greater than a thickness of the second layer.

5. The method of claim 1, wherein the design comprises at least one of bar codes, matrix bar codes, quick response codes (QR codes), data matrix codes, proprietary codes, triangular codes, numeric bar codes, alpha-numeric bar codes, 2-dimensional bar codes, symbols, written characters, letters, numerals, alphanumerics, glyphs, pictograms, syllabograms, logograms, or combinations thereof.

6. The method of claim 1, wherein the first material is applied to the substrate via the cold spray process.

7. The method of claim 6, wherein the second material is applied to the first material via the cold spray process.

\* \* \* \* \*